United States Patent
Long

[11] Patent Number: 6,149,493
[45] Date of Patent: *Nov. 21, 2000

[54] TURKEY CALL AND ACCESSORIES

[76] Inventor: Kenneth W. Long, P.O. Box 71, El Dorado Springs, Mo. 64744

[ * ] Notice: This patent is subject to a terminal disclaimer.

[21] Appl. No.: 09/207,162

[22] Filed: Dec. 7, 1998

Related U.S. Application Data

[63] Continuation-in-part of application No. 08/929,756, Sep. 15, 1997, Pat. No. 5,846,119.
[60] Provisional application No. 60/026,271, Sep. 18, 1996.

[51] Int. Cl.[7] .................................................... A63H 5/00
[52] U.S. Cl. ........................................ 446/397; 446/404
[58] Field of Search ..................................... 446/397, 398, 446/404, 415, 416, 202, 207, 208; 43/1, 2; 119/713, 719

[56] References Cited

U.S. PATENT DOCUMENTS

| | | |
|---|---|---|
| 2,606,401 | 8/1952 | Boatwright . |
| 2,610,441 | 9/1952 | Unger . |
| 2,642,699 | 6/1953 | Green . |
| 2,643,483 | 6/1953 | Walker . |
| 3,100,948 | 8/1963 | Tax . |
| 3,793,767 | 2/1974 | Pulley . |
| 4,041,639 | 8/1977 | Funk . |
| 4,343,108 | 8/1982 | Lee . |
| 4,527,985 | 7/1985 | Zoschg et al. . |
| 4,648,852 | 3/1987 | Wingate . |
| 4,941,858 | 7/1990 | Adams .................................... 446/397 |
| 4,988,325 | 1/1991 | Alderson et al. . |
| 5,178,575 | 1/1993 | Koch ...................................... 446/397 |
| 5,830,036 | 11/1998 | Richardson ............................. 446/397 |
| 5,921,842 | 7/1999 | Allenby ............................... 446/404 X |

*Primary Examiner*—D. Neal Muir
*Attorney, Agent, or Firm*—Jonathan A. Bay

[57] ABSTRACT

A wooden box call is modified such that its actuator top can flip over in order to allow presenting either of the opposite broad faces of the actuator top for rubbing against a sidewall edge of the box. The actuator top is preferably a composite or a bi-material in the sense that it is made of two different materials laminated together. That way the opposite broad faces are distinct from one another at least in the respect that they are different materials. Alternate use of one or the other broad faces of the actuator top for rubbing against a sidewall edge of the box provides at least two different varieties in the characteristic pitch obtained by the material of either. Additionally, a stylus-type scrape call is modified to allow adjustable pitch by the combination of a stylus and an associated damper-handle which has a hole through it in which the stylus is inserted and secured. The damper-handle includes a clamping mechanism to allow its secure connection on the stylus to be relaxed and re-tightened for changing where the stylus is connected thereto, and thus changing the undamped free length of the stylus to become relatively shorter or longer as desired. That way, a user can adjust the pitch of the stylus by changing its undamped length of extension or retraction since generally the pitch goes higher with relative shortening of the undamped free length (and vice versa).

19 Claims, 6 Drawing Sheets

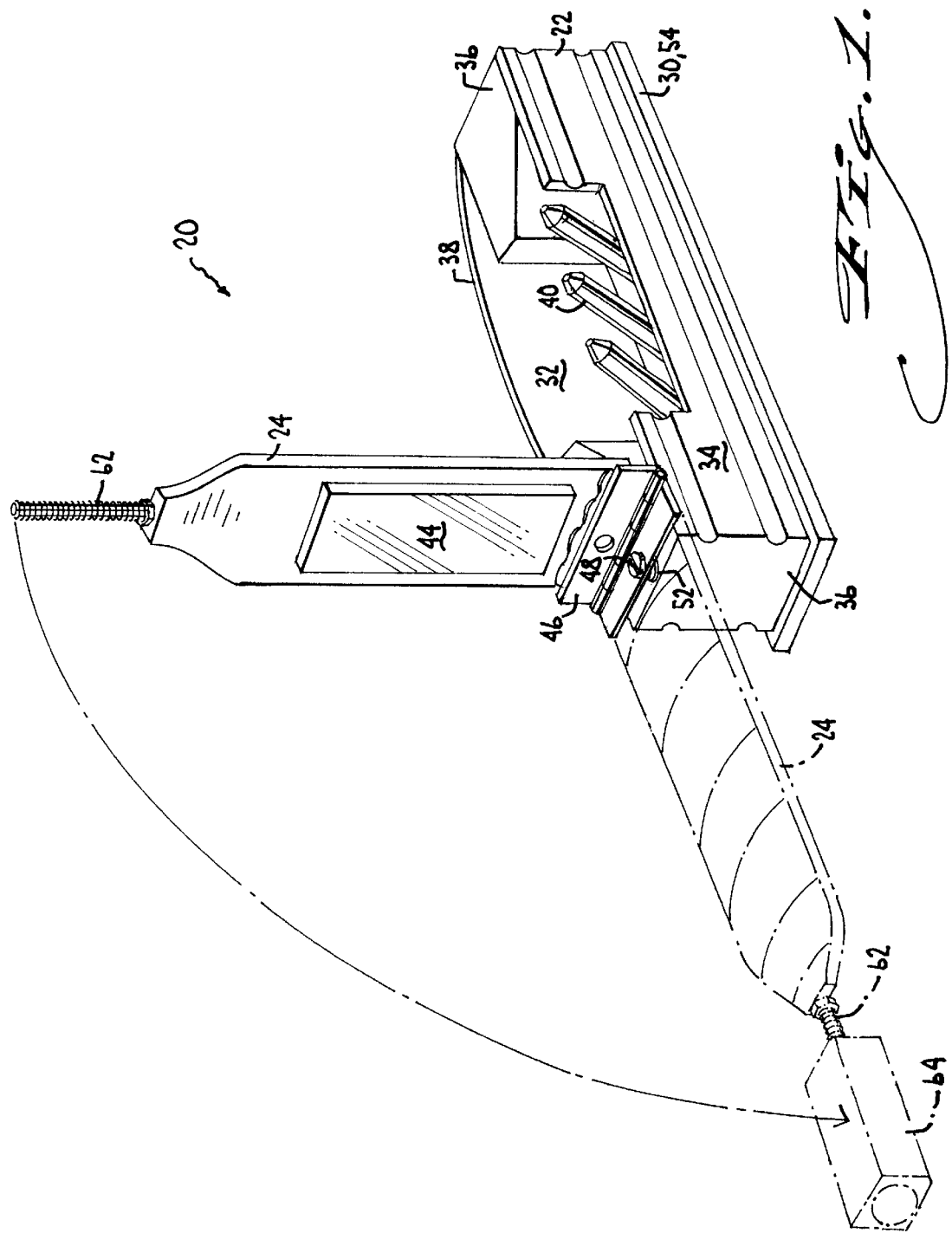

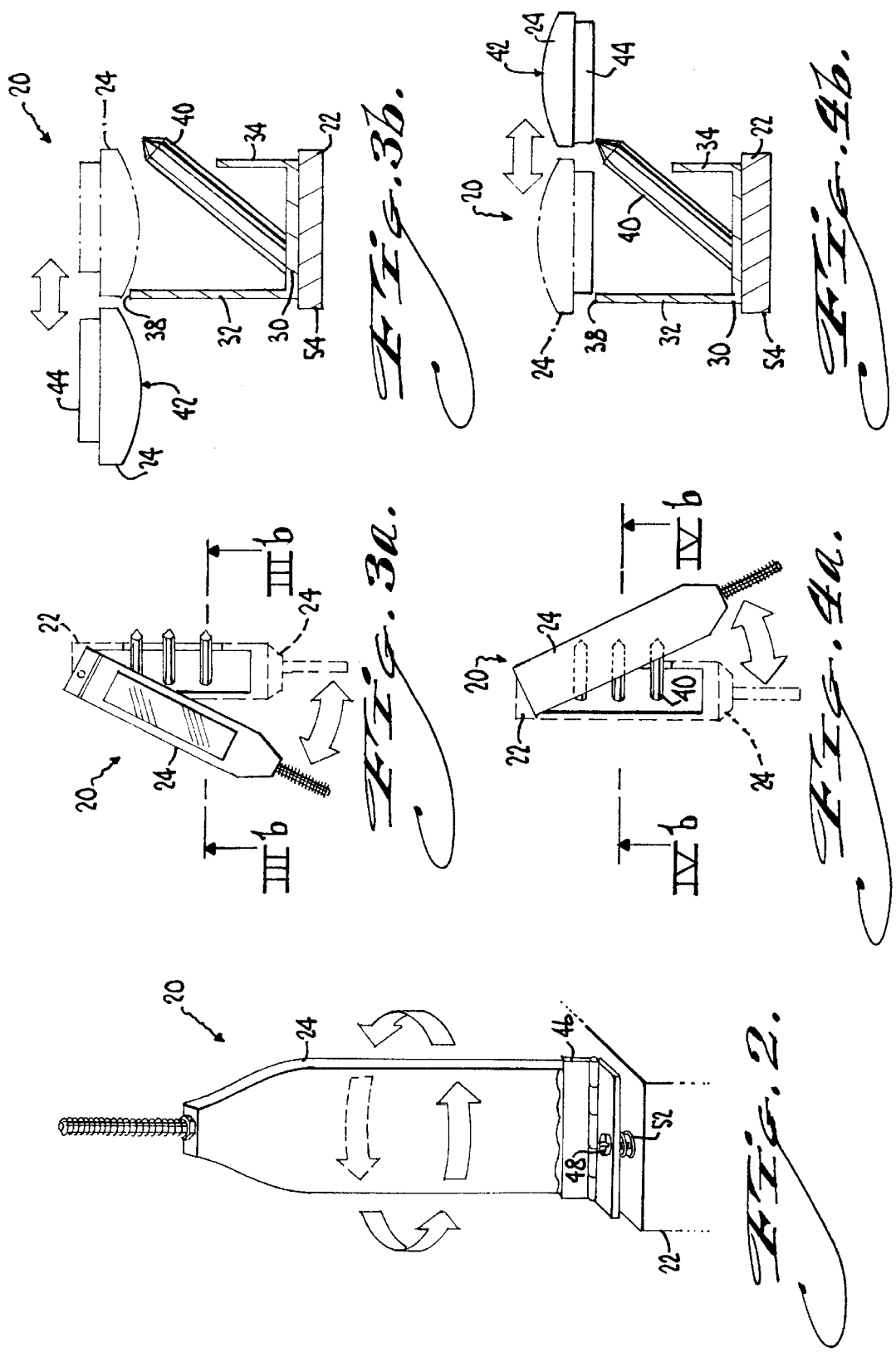

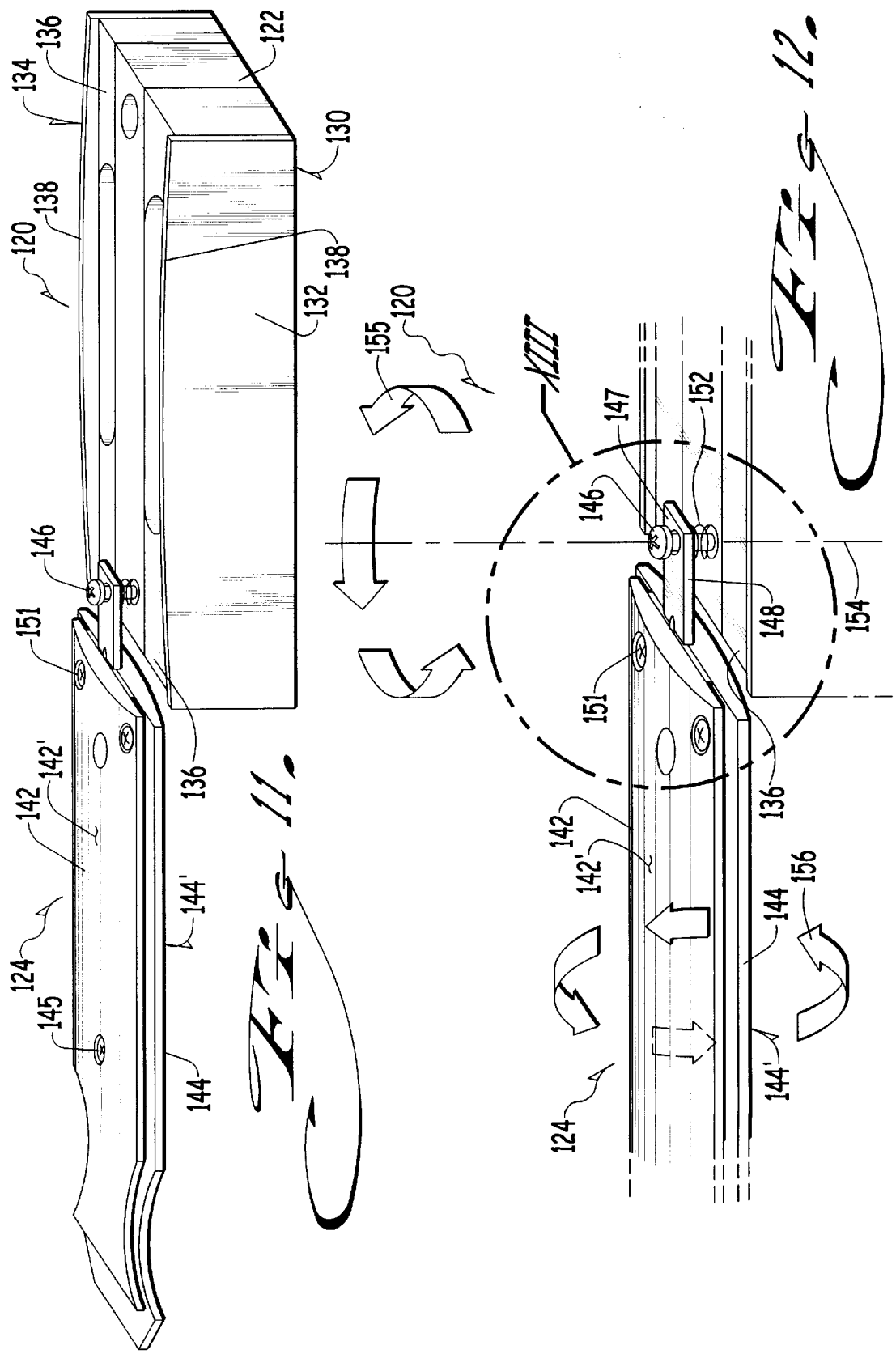

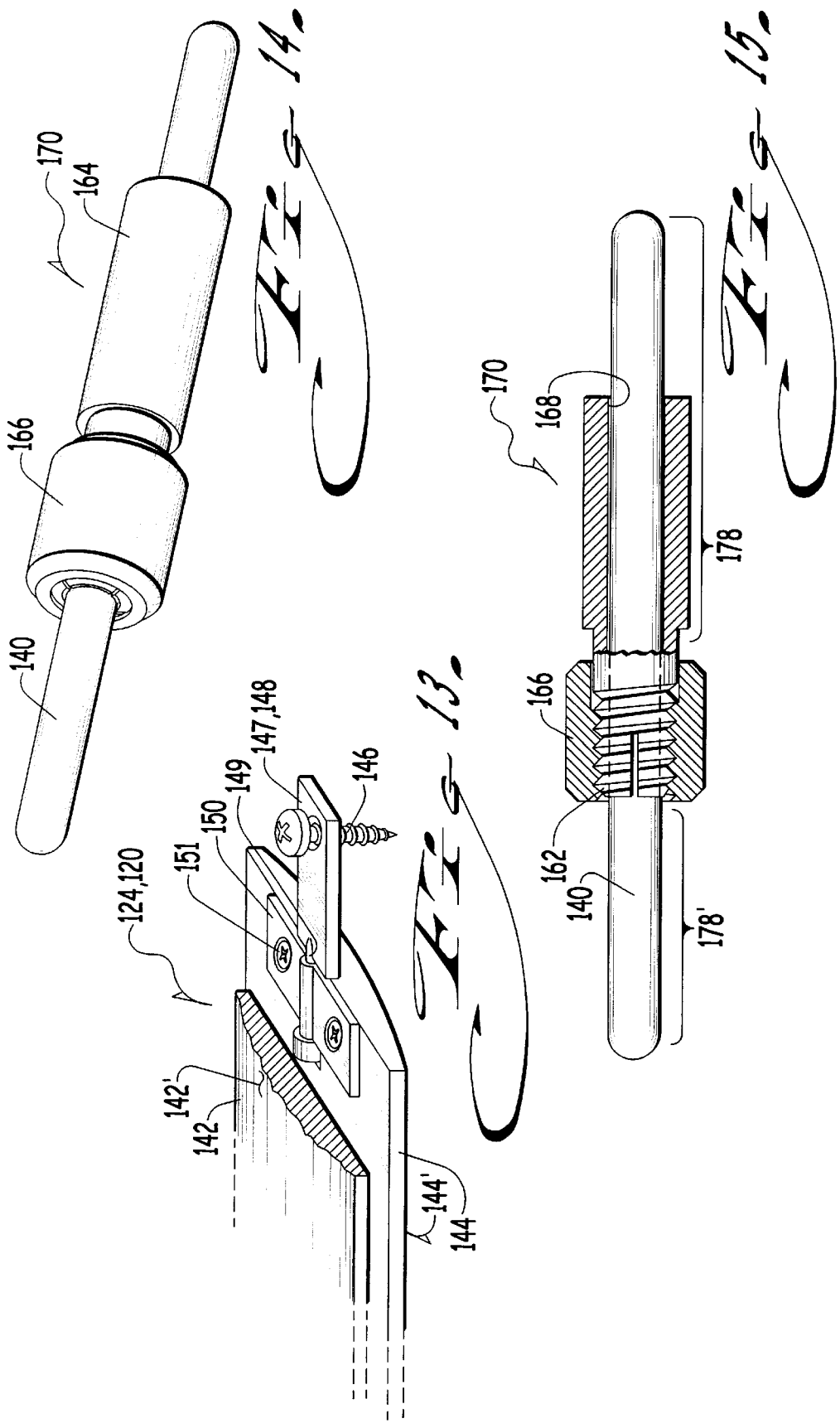

TURKEY CALL AND ACCESSORIES

CROSS-REFERENCE TO RELATED APPLICATION(S)

This is a continuation-in-part of Application No. 08/929,756, filed Sep. 15, 1997, issuing as U.S. Pat. No. 5,846,119, which claims the benefit of U.S. Provisional Application No. 60/026,271, filed Sep. 18, 1996.

BACKGROUND AND SUMMARY OF THE INVENTION

Insofar as this disclosure may contain material subject to copyright protection, the copyright owner has no objection to unlimited reproduction by anyone of the patent disclosure or any portion of the Patent Office file, but otherwise reserves all copyrights.

The invention generally relates to turkey calls and accessories therefor, usefull by hunters, photographers and game-watchers and the like to reproduce yelps, cackles, purrs, clucks and so on, to attract wild turkeys.

Turkey call devices are used to produce mimic turkey calls in hopes of inducing a live bird to respond and approach the caller. Use of these call devices is fairly an art form. A bird is easily spooked by inartful use of a given call device. A shortcoming with the conventional call devices is that each model characteristically has one "voice" or tone or resonance that characterizes that model. If an inartful caller has spooked a bird one day with a given model, even an artful caller will unlikely attract the bird in the next successive days with that same model. The bird will shy from that "voice." Also it is common practice for turkey callers to carry several calls with them because a turkey may ignore several "voices" before responding to a particular "voice." What is needed is an improvement which overcomes the shortcomings of the prior art and provides a caller with more versatility in the field for varying the tone, pitch or resonance of his or her call device.

According to one aspect of the invention, a wooden box call is modified such that its actuator top can flip over in order to allow presenting either of the opposite broad faces of the actuator top for rubbing against a sidewall edge of the box. The actuator top is preferably a composite or a bi-material in the sense that it is made of two different materials laminated together (eg., glued, bonded or even fastened or joined by whatever suitable means). That way the opposite broad faces are distinct from one another at least in the respect that they are different materials. Alternate use of one or the other broad faces of the actuator top for rubbing against a sidewall edge of the box provides at least two different varieties in the characteristic pitch obtained by the material of either.

According to another aspect of the invention, a peg or stylus can be formed with screw thread on a portion of it, and can be screwed into its a base or damper handle provided for it. That way the undamped length of extension of the stylus from where it is screwed into the base (or alternatively termed, eg., the damper-handle) can be adjusted, thereby changing the stylus's free length to become relatively longer or shorter. That way, a user can tune the pitch of the stylus by twisting it in deeper in its threaded socket or backing it out slightly in order to change its undamped free length. To put this in different words, a stylus-type scrape call is modified to allow adjustable pitch by the combination of a stylus and an associated damper-handle having a hole through it in which the stylus is inserted and secured. The damper-handle includes a clamping mechanism to allow its secure connection on the stylus to be relaxed and re-tightened for changing the position where the stylus is connected thereto, and thus changing the undamped free length of the stylus to become relatively shorter or longer as desired. That way, a user can adjust the pitch of the stylus by changing its undamped length of extension or retraction from the damper-handle, since generally the pitch goes higher with relative shortening of the undamped free length (and vice versa).

A number of additional aspects and objects will be apparent in connection with die following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a box-type turkey call in accordance with the invention, wherein a changed position for a lid thereof is shown in dashed lines;

FIG. 2 is a perspective view of the lid, generally comparable to FIG. 1 except from a relatively changed vantage point and with portions of the box base broken away, wherein direction arrows are included to show an axis about which the lid can spin relative to the box base;

FIGS. 3a and 3b are a pair of views which together illustrate one manner of use of the inventive turkey call, however this manner of use is otherwise conventional, and it includes back and forth strokes of the lid relative the box base, wherein:

FIG. 3a is a reduced scale plan view, and,

FIG. 3b is an enlarged scale, partial section view taken through line IIIb—IIIb in FIG. 3a;

FIGS. 4a and 4b are a pair of views comparable to FIGS. 3a and 3b except illustrating another, and in this instance inventive manner of use of the inventive turkey call in which the lid has been spun a half turn to orient its opposite side for use, wherein:

FIG. 4a is a plan view, and,

FIG. 4b is an enlarged scale, partial section view taken through line IVb—IVb in FIG. 4a;

FIGS. 5a and 5b are comparable perspective views of an accessory turkey call in accordance with the invention, wherein:

FIG. 5a shows complete assembly, and,

FIG. 5b shows partial disassembly;

FIG. 11 is a perspective view of an alternate version of the FIG. 1 box-type turkey call and in accordance with the invention;

FIG. 12 is an enlarged scale perspective view of FIG. 11, with opposite end portions broken away, wherein two sets of spin-direction arrows are included to show axes about which the lid can spin relative to the box base;

FIG. 13 is an enlarged scale perspective view taken of detail XIII in FIG. 12;

FIG. 14 is a perspective view of an alternate version of the FIG. 6 stylus-type scrape call and in accordance with the invention; and, FIG. 15 is partial section view taken through an axis of symmetry of the FIG. 14 turkey call.

DETAILED DESCRIPTION OF THE PREFERRED EMBODIMENTS

Figure 6:
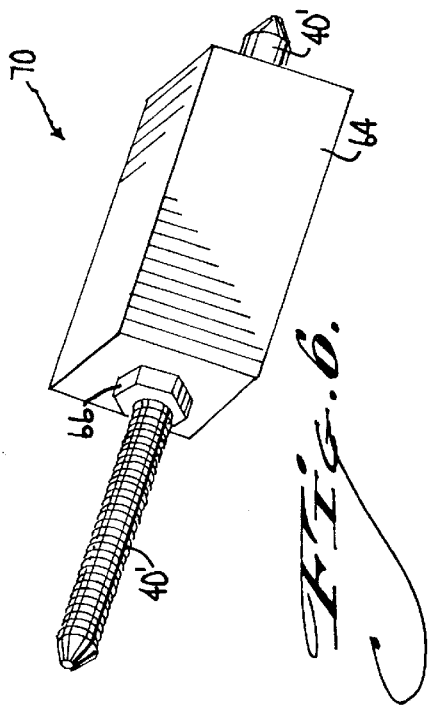
FIG. 6 is a perspective view of an alternate embodiment of an accessory turkey call in accordance with the invention.

In FIG. 1, a box-type turkey call 20 in accordance with the invention comprises a generally rectangular, elongated upwardly open wooden box assembly including a base 22 and an attached actuator top or lid 24. The box base 22 is wooden and has an open-box shape formed by a bottom wall 30 carrying opposed sidewalls 32 and 34 spaced by opposite end pieces 36. One side wall 32 is conventional and has a conventional upper curved or convex edge 38 exposed for strokes or scraping against it by the lid 24. An inventive aspect of the box base 22 relates to inclined reeds or pegs 40 that are anchored in the bottom wall 30 to extend laterally out and away from their respective points of origin in the bottom wall 30 (their origin in the bottom wall 30 not in view in FIG. 1), to terminate in pointed tip or scrape ends. Three pegs 40 are shown by the drawing figures, however a user could remove one or more of the pegs 40 from the box 20 because they are inserted by screw thread, and thus get by with two or one of the pegs 40. Also, more pegs 40 than three could be added by forming further threaded sockets for them in the base 22 and screwing them in, although this is not shown.

Whereas the pegs 40 can be wooden too, the pegs 40 preferably are made from other suitable materials including without limitation fiberglass as well as Plexiglas™ (eg., a popular brand of an acrylic plastic) or like polymer or moldable resinous materials. The side wall 34 opposite the conventional wall is notched to allow the pegs 40 to protrude as shown.

The lid 24 is double-sided or -faced. FIGS. 3b and 4b show that one side or face 42 of the lid is conventional and is rounded or convex for rubbing or scraping against the convex edge 38 of the conventional sidewall 32 (i.e., see FIG. 3b). The opposite side of the lid 24 has a plate 44 of flat hard material, i.e., a striking plate or "strike-plate," fastened to it (see FIGS. 1, 3b and/or 4b). The material for the strike-plate 44 can be chosen from a group that includes without limitation such materials as slate, tempered glass, Pyrex™ glass or aluminum and so on. The lid 24 is fastened to the end piece 36 by a small hinge 46 which pivots on a screw 48 with a compressed coil spring 52 between the end piece 36 and hinge 46. The screw 48 is anchored into the end piece 36 and located either centered between the sidewalls as shown, or, alternatively, off-center (not shown). Given the foregoing, the lid 24 can pivot via the hinge 46 as shown by FIG. 1, or be flipped to spin about the screw 48 as shown by FIG. 2, so that, as a result, the lid 24 can be turned or "flipped" over for orienting one side or the other alternatively to the sidewall edges 38, or to the pegs 40, without detaching the lid 24 to do so.

FIGS. 3a and 3b show that the turkey call 20 in accordance with the invention allows conventional use via strokes or scrapes of the conventional convex face 42 of the lid 24 against the conventional convex sidewall edge 38, to produce sounds preferably simulative of turkey noises. In use, the conventional face 42 of the lid 24 is coated with chalk (chalk not shown) to eliminate slip or promote frictional grabbing between the chalk-coated face 42 and conventional sidewall edge 38. Experience with the modified lid 24 as shown by FIGS. 3a and 3b (i.e., modified as compared to a conventional lid without the strike-plate 44) has taught that the pitch changed depending on if the strike-plate 44 was attached or not. If the strike plate 44 is attached, the pitch is relatively lower. The changing pitch has been attributed to the relatively increased mass of the lid 24 while the strike-plate 44 is affixed to it.

A problem with conventional box-type turkey calls has been that, in wet outdoor weather, dampness often seeps into the chalk regardless of what care is taken to keep the turkey call dry. The ability to produce quality turkey calls is drastically reduced if not lost after the chalk-coated face picks up too much dampness.

An inventive aspect of the FIG. 1 turkey call 20 relates to the side of the lid 24 opposite the conventional side 42, the one that carries the strike-plate 44. The lid 24, because it is attached to the end piece 36 via the hinge and screw arrangement 46 and 48, can be turned over for orienting the strike-plate 44 for use against the scrape ends of the reeds or pegs 40, as shown by FIGS. 4a and 4b, without detaching the lid 24 from the end piece 36.

The pegs 40 are formed with threads at one end (not in view in FIG. 4b) for tightening the pegs 40 into threaded sockets (not shown) in the bottom wall 30 of the box base 22. The bottom wall 30 of the box base 22 in accordance with the invention has been modified to give it more thickness than is conventional. The bottom wall 30 includes in attached subbase 54 so that, together, the bottom wall and subbase 30 and 54 have sufficient thickness to support the pegs 40 in the threaded sockets, and in opposition to forceful strokes of the lid 24. Stroking the strike-plate 44 across the pegs 40 allows a user to produce sounds simulative of turkey yelps, purrs, clucks and so on.

Further advantages of the system of pegs and strike-plate 40 and 44 include the following. The sound quality given by the pegs and strike-plate 40 and 44 remains relatively the same if damp or dry (as long as the pegs 40 are not wooden). The number of pegs 40 in use can be varied between one and three (or up to however many the bottom wall 30 is adapted to carry). One peg gives off a relatively purer tone than two or more pegs. In contrast, two or more pegs give off multiple tones and more resonance.

The traditional materials for peg and strike-plate calls have been wooden pegs and slate strike-plates. In traditional use, a wooden peg was dragged across a slate strike-plate. To the ears of some users, however, wood on slate fails to give off a correct-sounding squall. Also, wood on slate is susceptible to problems if damp.

In accordance with the invention, the strike-plate 44 is dragged across the stationary pegs 40, rather than the other way around as was traditional. Preferably, the pegs 40 are made from a suitable polymer or moldable resinous material and, even more preferably, Plexiglas™ or fiberglass. The effectiveness of either Plexiglas™ or fiberglass is relatively unaffected by dampness. Whereas the strike-plate 44 may satisfactorily be made from slate, Pyrex™ or tempered glass is preferred because these materials are less susceptible to erosion or groove-forming after many strokes against the pegs 40. If the strike-plate 44 is made from Pyrex™ or tempered glass, the glass surface has to be properly prepared for use as a strike-plate. Generally, this involves scoring the surface of the glass to form in it miniature transverse grooves. Scoring can be accomplished via polishing with Emory cloth or by any other suitable means.

With general reference to FIGS. 4a and 4b, a user can vary the angle of attack of the strike-plate 44 relative the pegs 40, at least within limits. The preferred angle of attack to give the best sound quality varies with material of the strike pate 44 as well as the material of the pegs 40. During initial design of a prototype turkey call in accordance with the invention, the angle at which the pegs 40 are inclined relative the bottom wall 30 is arrived at by trial and error for any given combination of materials until the desired sound is achieved. The alignment given by FIG. 4b is representative of a combination of( fiberglass pegs 40 with a Pyrex™ glass strike-plate 44.

The choice of materials also varies the tolerance for error in accurately finding the preferred angle of attack. A strike-plate of slate, when compared to scored Pyrex™ or tempered glass, is a more forgiving material in terms of angle of attack, and allows the user to get desirable performance through a relatively greater range of angular alignments. Pyrex™ and tempered glass, in contrast, require more accurate alignment. Misalignment occurs at much less a deviation from any optimum angle of attack. An improper angle of attack generally causes problems with ineffectual sound production. More simply, it just won't work if the angle is improper. However, a user typically solves the problem, whether with slate or glass, through trial and error by ear, varying the angle of attack by hand. FIG. 4b also shows that the pegs 40 are preferably spaced sufficiently away from the adjacent sidewall 34 so they do not touch, as this deadens the sound, and/or raises the pitch because of the acoustical shortening of the pegs. Put differently, this works something like "noting" a guitar.

Figure 5A:
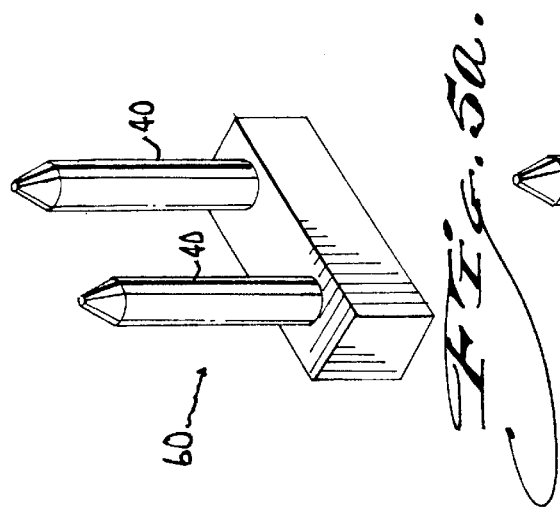
Figure 5B:
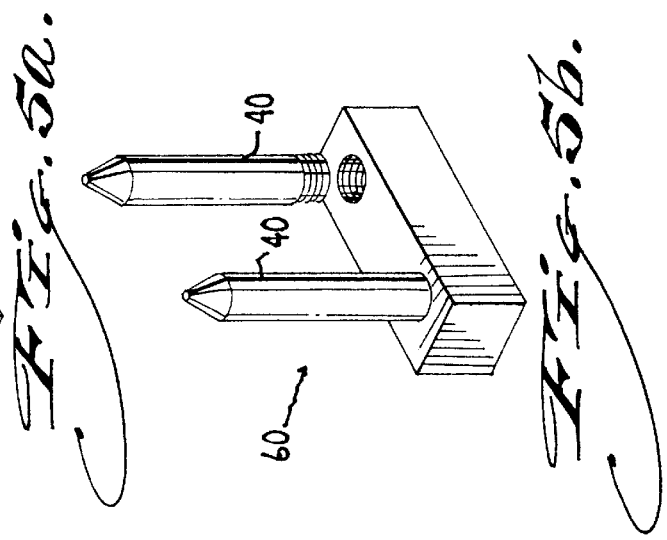

FIGS. 5a and 5b show an accessory 60 in accordance with the invention to accompany the box-type turkey call 20 in FIG. 1. The accessory 60 is hand-held striker to rub against the strike-plate 44 on the lid 24 of the FIG. 1 turkey call 20 (this rubbing is not shown). The hand-held striker 60 comprises a bracket or base fixture formed with threaded sockets and a pair of pegs 40 which optionally might be two of the three pegs 40 shown in FIG. 1 removed for tightening into the bracket fixture shown by FIG. 5a. In FIG. 5b, the hand-held striker 60 is shown in a condition of partial disassembly. In use, a user grasps the lid 24 of FIG. 1 turkey call 20 in one hand and holds it relatively stationary (not shown). The user then rubs the pegs 40 in the hand-held striker 60 of FIG. 5a against the relatively stationary strike-plate 44 (not shown). It is believed that the hand-held striker 60 as shown produces sound the same way that a tuning fork does;: i.e., the pegs resonate or vibrate opposite each other on about the same frequency. The advantage of the hand-held striker 60 is that it gives a user another tool to produce mimic calls having resonance as well as variety in sounds and/or pitches to attract turkeys.

Figure 7:
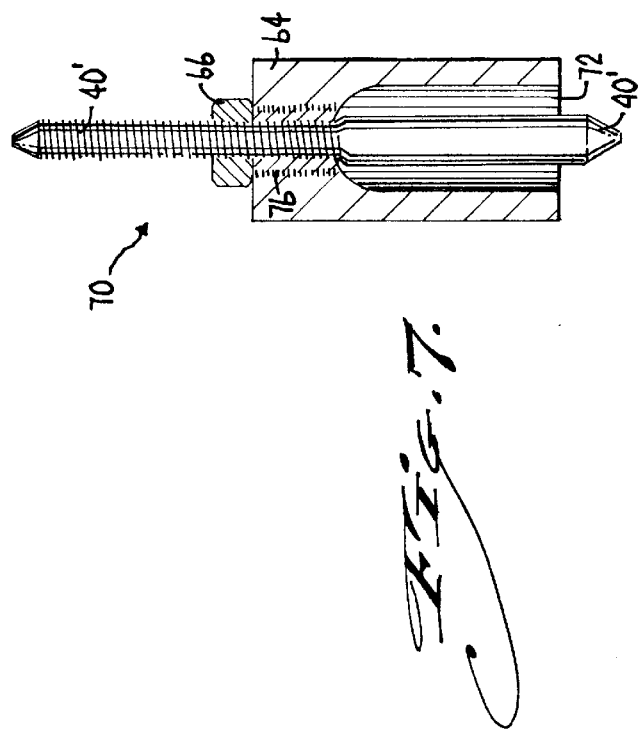
FIG. 7 is partial section view taken through an axis of symmetry through the FIG. 6 turkey call.

Turning back to FIG. 1, the lid 24 of the turkey call 20 extends away from the hinge 46 to terminate in a threaded stud 62 that carries a knob 64 locked in position by a common nut (not in view). FIGS. 6 and 7 show that this knob and nut 64 and 66 are removable and, in combination with a removed one of the pegs 40/40' from the FIG. 1 turkey call, can be assembled as shown to form an alternate hand-held striker 70 in accordance with the invention.

FIGS. 6 and 7 show, however, a different version of a peg 40' from the ones shown by FIG. 1. The FIGS. 6 and 7 peg 40' is relatively longer, and substantially more of it is formed with external threads. In FIG. 7, the knob 64 has formed in it on its central axis a counterbore portion 72 (i.e., the lower portion as the knob is oriented in FIG. 7) defining a sound chamber for the knob 64 for surrounding without touching portions of the peg 40', and a separate portion (i.e., the relatively upper portion as the knob is oriented in FIG. 7) formed with internal thread. The peg 40' is assembled to the knob 64 by inserting its threaded end first into the sound chamber 72, and then screwing the peg 40' optionally until positioned as shown. To complete the assembly, the nut 66 is twisted on the projecting threads of the peg 40' until tight against the knob 64. When complete, the pointed end of the peg 40' extends out from the sound chamber 72 as shown. The completed assembly forms a hand-held striker 70 that can be rubbed against the strike-plate 44 on the lid 24 as was described above in reference to the FIGS. 5a and 5b hand-held striker 60 (although this is not shown with either version of hand-held strikers 60 or 70). Various inventive aspects of the FIGS. 6 and 7 striker 70 include the following.

The pitch given by the peg 40' is adjustable (i.e., tunable) because adjusting the position of the peg 40' in the knob 64 between an extreme retracted position (i.e., as shown in FIG. 7) and an extreme extended position (not shown) changes the relative pitch given by the peg 40'. The advantage of adjustability includes eliminating the need to carry a variety of pegs to get a variety of pitches, regardless whether the pegs be of different sizes or material. A user only need carry the one peg 40' in accordance with the invention. A user can quickly experiment with the peg 40' in different positions of extension and retraction by twisting the peg 40' a little, tightening the nut 66, rubbing the strike-plate 44, and then, depending if the user gets the desired pitch or not, locking the peg 40' in place with the lock nut 66 twisted more completely tight or else continue adjusting.

The knob 64 is preferably wooden. The knob 64 in effect behaves as a vibration damper and resonator. Experimentation has determined that a walnut knob gives a relatively lower pitch than oak, but walnut requires a steel sleeve 76 and oak does not (the absence of a sleeve 76 is not shown) because walnut is not sufficiently strong when directly formed with internal thread to adequately support the peg. Still, for some users, the tone given by a walnut knob will be preferred over an oak knob's such that the added cost of manufacture to include a steel sleeve may justify itself.

Figure 9:
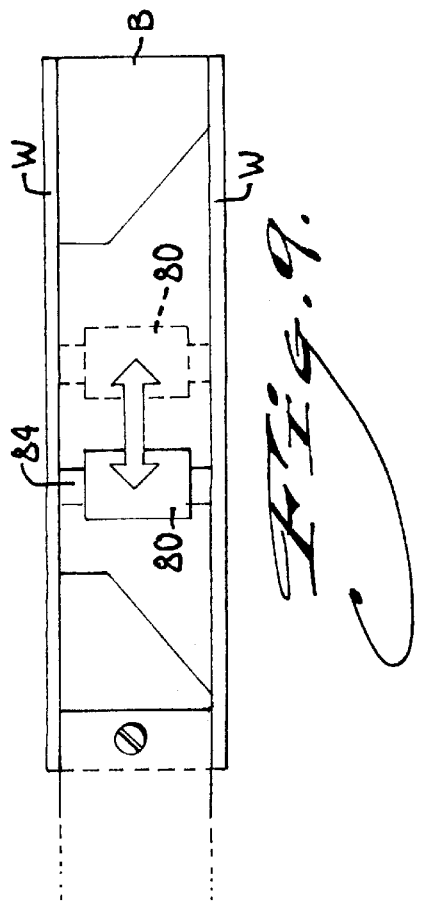
FIG. 9 is a plan view of the FIG. 8 accessory, as shown installed in a box base of a given box-type turkey call to illustrate how to use the accessory to vary the pitch of the turkey call.
Figure 8:
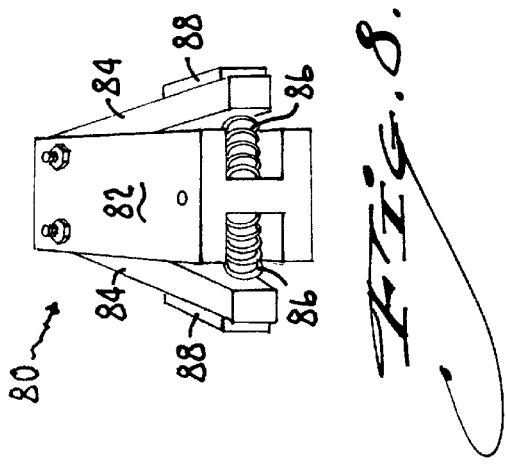
FIG. 8 is a perspective view of another accessory in accordance with the invention, for conventional box-type turkey calls.
Figure 10:
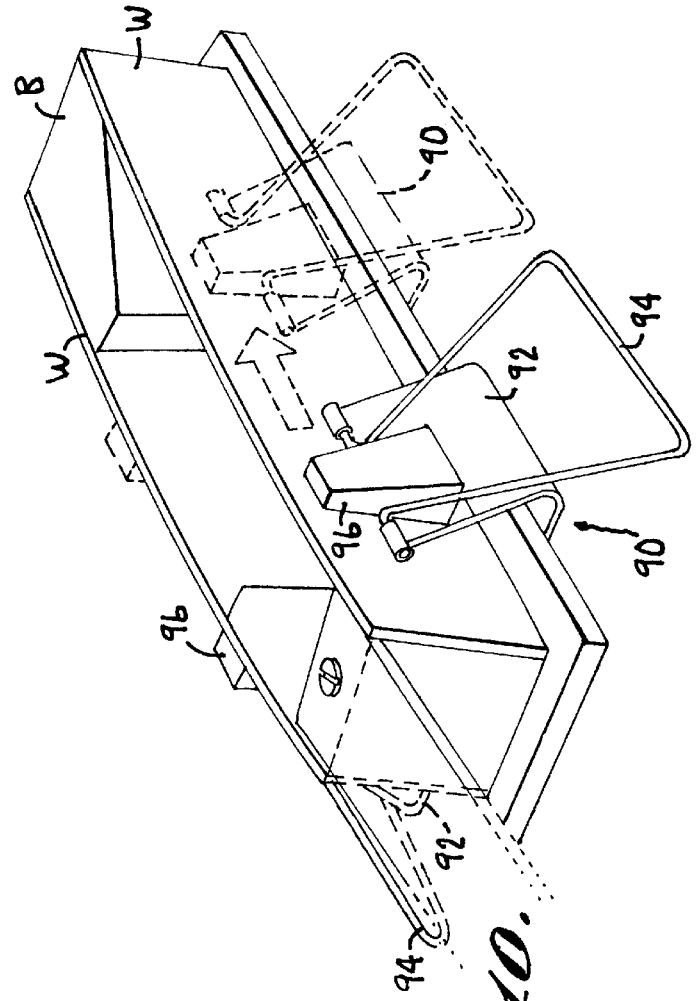
FIG. 10 is a perspective view of an additional accessory in accordance with the invention, for conventional box-type turkey calls, as shown installed on a box base of a given box-type turkey call to illustrate how to use this accessory to vary the pitch of the turkey call.

FIGS. 8 through 10 depict various accessories in accordance with the invention for tuning a conventional box-type turkey call B. FIGS. 8 and 9 show an internal vibration damper and/or tuner 80 in accordance with the invention. In FIG. 8, the tuner 80 comprises a central body 82 and a pair of opposite arms 84 attached to the central body 82 at inner ends by pivot pins. Opposite the inner ends are outer ends which are biased to flare out away from the central body 82 by miniature compression springs 86. The outer ends also carry small resilient pads 88. These pads 88 are optional and not especially necessary (although their removal is not shown by the drawing figures). These pegs 88 can be formed from such materials as sticky-backed weather stripping or the like, and are provided for deforming against the sidewalls W of the turkey call box B in use (shown and explained below in reference to FIG. 9). The compression springs 86 have opposite ends resting inside complementary sockets in the arms 84 and central body 82 (not in view). The central body 82 includes a pair of miniature machine screws to lock in place the ends of the springs 86 that rest inside the central body 82.

FIG. 9 shows the use of the internal tuner 80 in accordance with the invention. Also shown is a given conventional box base B of a box-type turkey call to illustrate the operative environment for the internal tuner 80. The box base B includes opposed sidewalls W of which one is a high side and the other a low side, which correspond to producing low pitches (from the low (long) side) for simulating gobbler noises and high pitches (from the high (short) side) for simulating hen noises. Insertion of the internal tuner 80 as shown results in the arms 84 spread out between the spaced side walls W and the arms 84 (not in view) compressed. Insertion of the tuner 80 in any position in the box B causes the pitch of either sidewall W to become relatively higher. The low-pitch limit for a given sidewall will be the condition when the tuner 80 is removed from the box B. The high-pitch limit that can be obtained by a single tuner 80 is, when the tuner 80 is positioned at the center between the opposite ends, such that the tuner 80 partitions the box B into equal halves. Moving the tuner 80 off-center to or away one end or the other results in a relatively lower pitch (i.e., when compared to the center position). Higher pitches can be obtained by use of another like tuner (not shown) in combination with the original, wherein the highest pitch obtainable with two tuners 80 is likely achieved when the tuners 80 are position partitioning the box B into equal thirds.

FIG. 10 shows an alternate tuner 90 in accordance with the invention, which acts on the box B from the outside. This external tuner 90 is configured much like a binder clip found in office supply and stationery stores for clasping together a stack of papers. The external tuner 90 includes a U-shaped body 92 made of spring steel or the like which is flexed open by pivotal lever arms 94 if pinched together by a user. The U-shaped body 92 carries resilient pads 96 on its opposite edges for resting against the outside of the spaced sidewalls W of the box B, as shown. In use, changing the relative position of the external tuner 90 between the ends of the box B varies the pitch of either sidewall W as was described above in reference to the FIGS. 8 and 9 tuner 80, except that point of contact on the sidewalls W occurs on the outside of the box B and not in the inside.

FIGS. 11 through 13 show an alternate version of the FIG. 1 box-type turkey call, and in accordance with the invention. According to one aspect of this alternate of the FIG. 1 box-type call, the box call 120 is modified such that its actuator top 124 can flip over in order to allow presenting either of the opposite broad faces 142' or 144' of the actuator top 124 for rubbing against sidewall edges 138 of the box 120.

In FIG. 11, the alternate-version box-type turkey call 120 in accordance with the invention comprises a generally rectangular, elongated upwardly open wooden box assembly including a base 122 and an attached actuator top or lid 124. The box base 122 is preferably wooden (although plastic boxes have been recently carried out with success and hence a plastic construction will suffice). The box base 122 has an open-box shape formed by a bottom wall 130 carrying opposed sidewalls 132 and 134 spaced by opposite end pieces 136. In this box-type call 120, each of the opposed sidewalls 132 and 134 are alike in including an upper curved or convex edge 138 exposed for strokes or scraping there against by the lid 124 in order to excite vibrations and hence produce mimic turkey calls.

An inventive aspect relates to the lid 124. The lid 124 has a composite construction. More particularly, the lid 124 is constructed of a pair of superposed layers 142 and 144. The layers 142 and 144 may alternately be laminated to each other or also may be fastened by a set of fasteners 145, 151.

Each layer 142 or 144 presents a convex broad face 142' and 144' respectively of the actuator top 124 for alternate use for rubbing against either of the driven edges 138 of sidewalls 132 or 134. Hence the inventiveness in composing the actuator top 124 as a bi-material (eg., in the sense that layers 142 and 144 are produced from respectively different materials) is that it allows alternate use of one or the other broad faces 142' or 144' of the actuator top 124 for rubbing against the sidewall edges 138 of the box 122 to get at least two different varieties of pitch, because each material of layer 142 and 144 presumably has a characteristic pitch obtained by that material 142 or 144 which is distinct from the other of 144 or 142.

FIGS. 11 through 13 also show an alternate version of a pivoting/flipping mechanism 146–152 for the actuator lid 124. The FIGS. 11–13 lid 124 is articulated to the end piece 136 for a comparable range of motion as shown by the FIGS. 1–4b lid 24. However, FIGS. 11–13 show an alternate pivoting/flipping mechanism 146–152.

The end block 136 has screwed into it an anchor screw 146 which is not tightened all the way down, but is purposely left with its head spaced off the end block 136 so that a short free portion of its shank is left exposed. The anchor screw 146 holds a pivot arm 147 in place by virtue of the pivot arm 147 having an apertured shoulder portion 148 formed with an oversized aperture (oversized, that is, relative to the shank diameter of the anchor screw 146. The exposed portion of the anchor screw 146's shank extends through the oversized aperture in the apertured shoulder 148.

FIG. 12 shows that the anchor screw defines an axis 154 about which the pivot arm 147 can revolve as shown by arrows 155. Because of the oversize aperture in its shoulder 148, the pivot arm 147 can also flap a small angle in the relative up and down direction (ie., up and down relative to the vantage point of FIG. 12, and not indicated). This small angle of flapping (again, not shown) is allowed by the loose fit of the apertured shoulder 148 on the anchor screw 146. The pivot arm's shoulder 148 is biased against the head of the anchor screw 146 by a small compression spring 152.

With more particular reference to FIG. 13, the pivot arm 146 has close to its terminal end a reduced-diameter wrist portion 149. The reduced-diameter wrist portion 149 has coupled to it the hub of a pair of wings 150. The wings and their hub 150 are preferably made from a single strip of thin gauge brass which in its pre-folded condition starts at about twice as long as its completed format 150. Producing the wing-and-hub piece 150 is accomplished by folding the brass-strip stock piece in about half (this is not shown) and as around the reduced-diameter wrist portion 149. The folded-in-half brass strip is centered on the reduced-diameter wrist portion 149 so as to get approximately equal-sized wings. Then the folded-in-half brass strip is compressed tightly (as perhaps by light hammering) onto the reduced-diameter wrist portion 149. This achieves a hub and axle connection between the folded-in-half brass wing structure 150 and the reduced-diameter wrist portion 149. FIGS. 11–13 show that the two layers 142 and 144 of the actuator top 124 are assembled flanking the wing-hub structure 150. A pair of fasteners 151 hold the wing-hub structure 150 and two layers 142 and 144 tightly together. Suitable clearance bores in the material of the two layers 142 and 144 allows the composite lid 124 to spin about the axis (not indicated) of the wrist 149, as indicated by a set of spin-direction arrows 156 in FIG. 12.

Given the foregoing, either version of the lid 24 or 124 can sweep such an arc as shown by FIG. 1 as correspondingly allowed by the hinge 46 of FIG. 1 or pivoting/flipping mechanism 146–152 of FIGS. 11–13. Also, either version of the lid 24 or 124 can rotate in such revolutions as shown by FIG. 2 as correspondingly allowed by the hinge 46 of FIG. 2 or pivoting flipping mechanism 146–152 of FIGS. 11–13. That way, the lid 24/124 can pivoted, flipped, spun or revolved in multiple axes all to allow coordinating either one side 142 or the other 144 for attacking the sidewall edge(s) 38 or 138—and, significantly, without detaching the lid 24/124 to do so.

To address one more time the aspects of the invention best shown by FIGS. 11–13, the major advantages have a whole lot less to do with the dual vibrator sidewalls 132 and 134 than, much more significantly, the dual scraping surfaces 142' and 144' of the composite lid 124.

The actions of either scraping surface 142' or 144' on any given edge 38 or 138 are comparable to the bowing of a violin string. That is, when a scraping surface 142' or 144' is placed on an edge 38 or 138 and drawn thereacross (eg., illustrated by FIGS. 3a, 3b), the edge 38/138 sticks to the scrape 142'/144', which pulls the edge 38/138 aside until the sidewall's elastic restoring force produced by its deflection becomes large enough to break the edge 38/138 loose from the scrape 142'/144'. The edge 38/138 now swings rapidly back after having slipped free, damped as it swings by sliding friction against the scrape 142'/144'. At the end of the backswing the edge 38/138 will come to rest is once again caught by the sticking friction of the scrape 142'/144', and recommences being pulled in the direction of the scrape 142'/144', to begin again a new cycle of the oscillation.

The purpose of providing a composite lid 124 of two scrapes 142' and 144' having been formed from different materials includes that, each material thereof has a characteristically different stick-slip friction dynamic associated therewith. Trials show that comparing use of each scrape 142' or 144'—as by rubbing one and then the other of the scrapes 142' or 144' on the same edge 38 or 138, with substantially the same applied contact pressure and at substantially the same speed—nevertheless finds that each scrape 142' can offer a substantially distinct pitch from the other. The distinctiveness can be changed by selection of diverse materials. Example materials experimented with have included walnut, oak and sassafras.

FIGS. 14 and 15 are set of views comparable to FIGS. 6 and 7 and showing an alternate version of the FIGS. 6 and 7 stylus-type scrape call having an adjustable pitch, and in accordance with the invention.

The FIGS. 14 and 15 stylus-type handheld scrape call 170 comprises a smooth wall stylus 140 inserted in and secured to a damper-handle 164. An example damper-handle 164 has been fashioned out of a portion of a broomstick (this is not shown), using a stub (eg., 164) cut off the broomstick's threaded end, and to include the thread portion 162. The thread portion 162 is slit axially with a pair of criss-cross end cuts, and then fitted with a threaded locking collar 166. The damper-handle 164 is hollowed out with a central lumen 168 having a slightly larger diameter than the stylus 140.

The slitted thread portion and locking collar 162 and 164 form a locking chuck to secure the stylus 140 in place. Relaxing and re-tightening the chuck 162/164 allows a user to change the position where the stylus 140 is held by the damper-handle 164. This allows a user to change the undamped free length 178 (or 178', the call 170 works from either end 178 or 178') of the stylus 140 to become relatively shorter or longer as desired. That way, a user can adjust the pitch of the stylus 140 by changing its undamped length 178 (or 178') of extension or retraction from the chuck 162/166 of the damper-handle 164.

Generally (in fact in practice always, the theoretical possibility of heterodyne actions excepted), foreshortening the usable free length 178 (or 178') of the stylus 140 correspondingly raises the pitch of the call 170. And vice versa, in that lengthening the usable free span 178 (or 178') of the stylus 140 correspondingly lowers (or deepens ) the pitch of the call 170.

In use either end 178 or 178' of the stylus 140 is scraped against a suitable strike plate such as strike plate 44 shown by FIGS. 1 et seq. The production of handheld scrape-type calls with the stylus-type call 70 of FIGS. 6 and 7 has been previously described in connection therewith.

An inventive aspect of the adjustable-pitch stylus-type scape calls 70 and 170 in accordance with the invention is that each allows adjusting the pitch of the call 70 or 170 by means of shortening or lengthening the free span 178 or 178' the stylus 40' or 140. Production of a sustained tone with calls 70 or 170 and strike plate 44 is comparable to what causes a piece of chalk to screech across a blackboard. Examination of a line drawn during such a screech shows that it is made up of a series of fine dots or dashes. If the piece of chalk is long and it is held lightly in the middle or at one end while the other end hops along the blackboard, one can easily observe the chalk alternately sticking to the board (making a mark) and then leaping forwardly to where it catches during the return trip of its more or less sinusoidal oscillation. This sort of frictional oscillation can arise whenever the frictional force between the two bodies is less when they are in relative motion than it is when they are stationary. In fact, the styluses 40' and 140 can be held in hand (free of the dampers 64 or 164) and noise can be produced. However, inclusion of the dampers 64 and 164 provides greatly needed consistency in pitch-production between one scrape and the next. It is generally not desirable to change the pitch of the call 70 or 170 unless a given pitch fails to attract the turkey(s). Only after repeated effort with a consistent pitch fails to attract the turkey(s) is it strategic to alter the pitch one way or another.

An alternative version of the handle-damper 164 (not shown) has simply a smooth-bore lumen 168 sized the same size as the stylus 140. There is no mechanically-twisted locking mechanism between the alternate version of the handle-damper 164 (again, not shown) and stylus 140. The acoustical coupling between the two is achieved simply by a tight compression fit which allows slip under a sufficient applied pressure to adjust the free spans 178 and/or 178'.

The inventor hereof has eighteen years prior trial and error experience in the field with calling turkeys. He has recounted his newly gained wisdom in use of the adjustable pitch stylus-type call 70/170 (eg., "tunable peg") once as follows.

"In the spring, I scout ahead of season so that I know the areas where gobblers roost. But I do not educate the birds by calling them before season. When I hunt, I get to the area before the birds start gobbling if I can. If I'm late, I may set up and call anyway. I like to get fairly close to where I think I should be so that when the birds start gobbling I can move into position quickly. I'd rather use an owl hoot before daylight to get a gobbler to reveal his position. A crow call sometimes works during the day. But be advised, however, that frequently hunted birds can be spooked by those calls. If is safest to wait for an old gobbler to start on his own.

"When I am in position 200 yards or so from where the wise old gobbler is roosting and am set up and ready, I wait until he gobbles, then I try a short series of calls. This I have done with my tunable peg call. If the gobbler responds immediately, I answer back enthusiastically then I shut up. I let him gobble for quite a while before I answer again so to be coy about it. Normally a gobbler calls the hen to the tree where he is roosting then flies down to mate with her. A caller has to reverse that role by being interested but reluctant. The sport is in calling the gobbler, not in roost shooting him out of the tree.

"If I find myself calling to the gobbler after he gobbles and he does not respond immediately but continues to gobble on his own schedule or not at all, I will make an adjustment to my tunable peg. In many cases a reluctant gobbler responds to a higher pitched mating yelp, so I leave myself room for change when I set my tunable peg for my first call. I keep changing pitches and call sparingly until I get an immediate response. On one gobbler, my Dad and I made five moves and used 18 calls in an hour-twenty minute time span before he exploded when I found the call he wanted. Another gobbler took there hours and we went 180° around him.

"If you" make a mistake and spook a gobbler, don't use the same pitch on him the next time you hunt him." © 1998 Kenny Long.

Given the foregoing, such adjustable pitch stylus-type scrapes 70 or 170 offer advantageous flexibility to the sport of calling turkeys by allowing changing the "voice" of the call on different occasions—but rare occasions. Once a pitch has been selected and tried, it recommended to stay with it to see its consequences, wait, be patient, but if after a patient wait no response, then change pitch. Aspects of the sport involve not only calling sparingly but changing pitch more sparingly. If a particular bird has been spooked by any given pitch, then that pitch is best abandoned for any subsequent calling to that bird.

The term "pitch" has a highly complicated technical meaning. It is less a measured value than an assigned value based on perception by, needless to say, human listeners. One standard text on the physics of musical acoustics introduces the term this way:

As a matter of fact, it [i.e.,"pitch"] is an exceedingly difficult word to define properly, although we can settle upon an unambiguous way of using it for present purposes. If we experiment with sequences of continuously repeating impulsive sounds, we find that the pitch we assign to a sufficiently rapid succession of impulses depends almost completely on the repetition rate and hardly at all on the nature of the special sound belonging to each individual impulse that makes up a given repetition series. Let me put this another way. If we conduct an experiment in which the ear is presented first with a tone from one source of repeated impulses and then with a tone from another source, we find that the source having the faster repetition rate of the two will be perceived as having the higher pitch. Furthermore, we normally hear the two pitches as being very nearly equal when the repetition rates are equal.

Arthur H. Benade, Ph.D., "Fundamentals of Musical Acoustics," ($2^d$ revised ed., Dover Pubs., Inc., 1990), p. 14. The meaning of pitch is then explored in at least two different chapters 185 pages apart. Evidently, a musical tone can be perceived as corresponding to a pitch of tuning fork vibrating at 440 Hz (eg., $A_4$) yet comprise a series of sinusoidal components no lower than 880 Hz. See, eg., A. H. Benade, supra, §14.4.D., entitled "The Musical Fifth," pp. 271–74.

Another standard reference defines "pitch" partly as follows.

"The quality of sound that fixes its position in the scale. Sounds produced by such instruments as a cymbal or bass drum are said to be of indefinite pitch. Pitch is determined by what the ear perceives as the most fundamental wave-frequency of a sound . . . "

The Norton/Grove Encyclopedia of Music. Again, pitch is determined by what the ear perceives as the most fundamental wave-frequency of a sound. In the example cited above, regarding "The Musical Fifth," the ear perceives or implies a pitch of the musical fifth summation of one fundamental frequency of 880 Hz and its harmonics, summed with another fundamental frequency of 1,320 Hz and its harmonics, as 440 Hz. Again the ear perceives a single 440 Hz tone which when it in fact is a composite of two much higher frequency tones (ie., in the relationships of 3/2 ratio) and (some of) their harmonics.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A box-type turkey call comprising:

an open-top box assembly having a bottom wall supporting upwardly-extending pairs of laterally-spaced side walls and longitudinally-spaced end walls to define a relatively open top, at least one side wall providing an upper rubbing edge for sound production of mimic turkey calls;

an actuator lid presenting a pair of spaced broad faces which extend in a lateral direction between spaced side edges and in a longitudinal direction between a proximal end and a spaced distal end, which distal end is adapted for manipulation by a user;

pivoting/alternating means, interconnecting a given end wall of the box assembly with the proximal end of the actuator lid, • for allowing relative pivoting between the actuator lid and box assembly so that a given one of the broad faces in a face-down orientation may be rubbed against the at least one side wall upper rubbing edge, as well as • for allowing relative alternating of the actuator lid for alternating back and forth between which of the pair of broad faces gets the face-down orientation relative to the box assembly's open top for rubbing against the at least one side wall upper rubbing edge.

2. The box-type turkey call of claim 1, wherein the actuator lid has a composite construction such that each broad face is formed from a different material so that in choosing between rubbing one broad face or the other against the at least one sidewall upper rubbing edge, a user is afforded at least two different varieties of pitch since each of the different materials presumptively has a characteristic pitch obtained by that material which is distinct from the other material.

3. The box-type turkey call of claim 2, wherein the actuator lid's composite construction takes the form of a bi-material lid formed by superposed layers of different materials.

4. The box-type turkey call of claim 1, the pivoting/alternating means comprises at hinge secured to one of either the actuator lid or the box assembly but pivoted to the other of the actuator lid or box assembly.

5. The box-type turkey call of claim 1, the pivoting/alternating means comprises a pivot arm extending axially between a shoulder and a wrist, the shoulder being pivoted to the given end wall of the box assembly, and the wrist being coupled to the proximal end of the actuator lid such that the actuator lid can spin generally about a pivot axis of the pivot arm.

6. The box-type turkey call of claim 1, the pivoting/alternating means further allows relative flapping of the actuator lid so that the angle of use of either broad face against the at least one side wall upper rubbing edge can be altered slightly to achieve desired sound production.

7. The box-type turkey call of claim 1, wherein the actuator lid is formed so that the broad faces thereof exhibit a given contour in the lateral direction chosen from one of flat, convex, concave, and other.

8. The box-type turkey call of claim 1, wherein the distal end is one of • shaped in, the form of a handle or • formed with a mounting fixture suitable for receiving a removably mounted handle.

9. A box-type turkey call comprising:

an open-topped box base having a bottom wall supporting upwardly-extending pairs of laterally-spaced side walls and longitudinally-spaced end walls to define a relatively open top;

an actuator lid presenting a pair of spaced broad faces which extend in a lateral direction between spaced side edges and in a longitudinal direction between a proximal end and a spaced distal end, which distal end is adapted for manipulation by a user;

pivoting/alternating means, interconnecting a given end wall of the box base with the proximal end of the actuator lid, • for allowing relative pivoting of the actuator lid generally over the open top of the box base assembly, as well as • for allowing relative alternating of the actuator lid for alternating back and forth between which of the pair of broad faces is preferentially oriented face-down over the box base's open top.

10. The box-type turkey call of claim 9, wherein the actuator lid has a composite construction such that each broad face is formed from a different material.

11. The box-type turkey call of claim 10, wherein the actuator lid's composite construction takes the form of a bi-material lid formed by superposed layers of different materials.

12. The box-type turkey call of claim 9, the pivoting/alternating means comprises a hinge secured to one of either the actuator lid or the box base but pivoted to the other of the actuator lid or box base.

13. The box-type turkey call of claim 9, the pivoting/alternating means comprises a pivot arm extending axially between a shoulder and a wrist, the shoulder being pivoted to the given end wall of the box base, and the wrist being coupled to the proximal end of the actuator lid such that the actuator lid can spin generally about a pivot axis of the pivot arm.

14. The box-type turkey call of claim 9, wherein the actuator lid is formed so that the broad faces thereof exhibit a given contour in the lateral direction chosen from one of flat, convex, concave, and other.

15. A box-type turkey call comprising:

an open-top box assembly having a bottom wall supporting a pair of upwardly-extending, longitudinally-spaced end walls and at least one upwardly-extending panel which extends longitudinally between the end walls, the at least one panel providing an upper rubbing edge for sound production of mimic turkey calls;

an elongated actuator member extending along an axis between a proximal end and a distal end, which distal end is adapted for manipulation by a user for producing mimic turkey calls as well as for spinning the actuator member for angular changes in position about said axis;

said actuator member having an outer surface between the ends thereof which presents at least two angularly separate rub faces thereon, wherein each rub face is generally elongated in the axial direction and generally extends in a trans-axial direction between angularly spaced edges;

pivoting/alternating means, interconnecting a given end wall of the box assembly with the proximal end of the actuator lid, • for allowing relative pivoting between the actuator lid and box assembly so that a given one of the rub faces in a facedown orientation may be rubbed against the at least one panel's upper rubbing edge, as well as • for allowing relative alternating of the actuator lid for alternating back and forth between which of the at least two rub faces gets the face-down orientation relative to the box assembly's open top for rubbing against the at least one panel's upper rubbing edge.

16. The box-type turkey call of claim 15, wherein the actuator member has a composite construction such that each rub face is formed from a different material so that in choosing between rubbing one rub face or any other against the at least one panel's upper rubbing edge, a user is afforded at least two different varieties of pitch since each of the different materials presumptively has a characteristic pitch obtained by that material which is distinct from the other material.

17. The box-type turkey call of claim wherein one of the rub faces is defined by attached panel of a given material which differs from the material of the at least one other rub face.

18. The box-type turkey call of claim 15, the pivoting/alternating means comprises a pivot arm extending axially between a shoulder and a wrist, the shoulder being pivoted to the given end wall of the box assembly, and the wrist being coupled to the proximal end of the actuator member such that the actuator member can spin generally about a pivot axis of the pivot arm.

19. The box-type turkey call of claim 15, wherein the actuator member is formed so that the rub faces thereof exhibit a given contour in the trans-axial direction chosen from one of flat, convex, concave, and other.

* * * * *